Oct. 6, 1936.  W. B. STOUT ET AL  2,056,220
CAR TRUCK
Filed Sept. 2, 1933   3 Sheets-Sheet 2
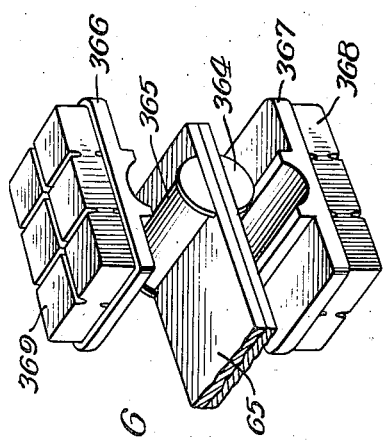
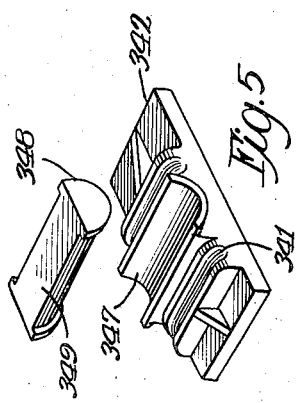
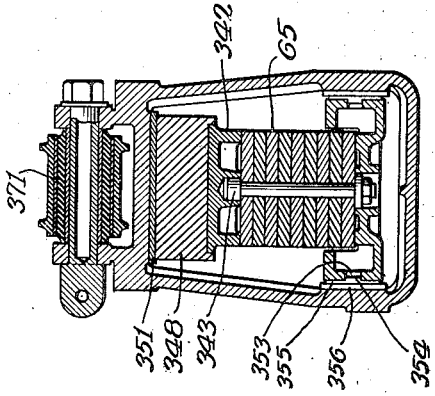
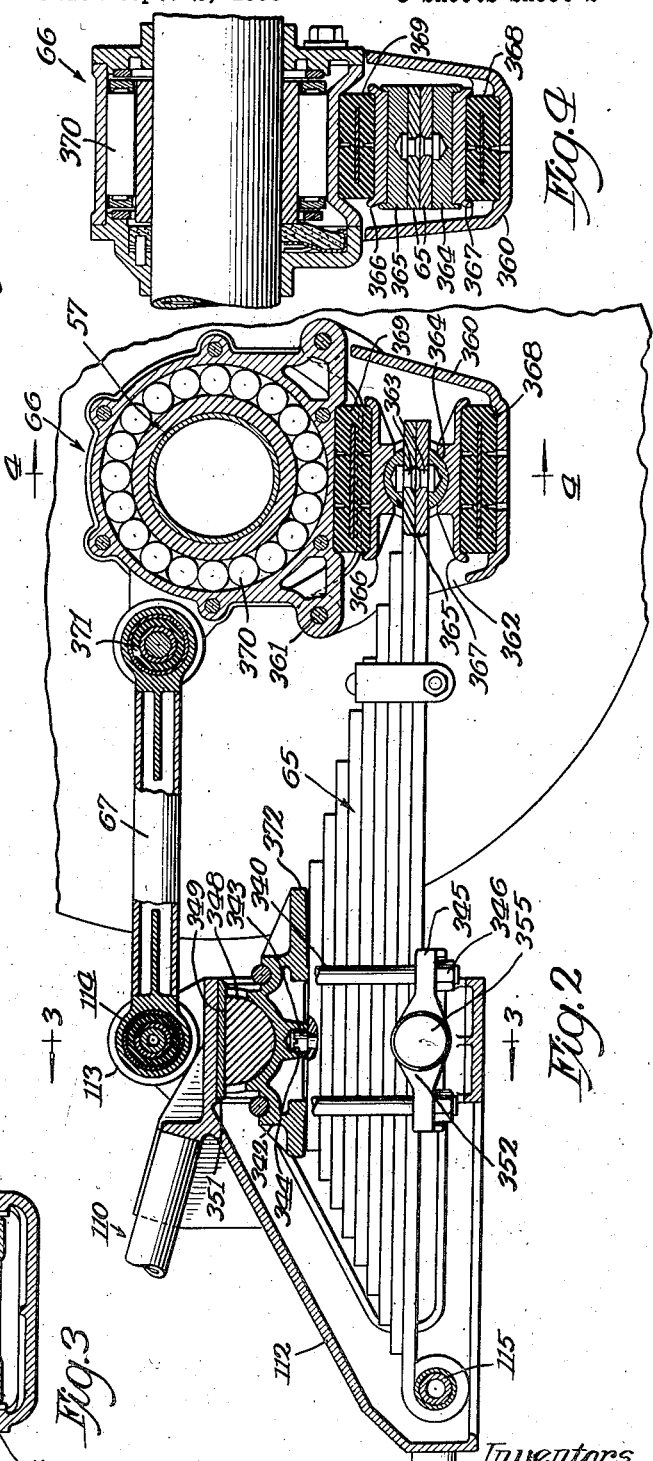
Inventors
William B. Stout & Evan H. Wright

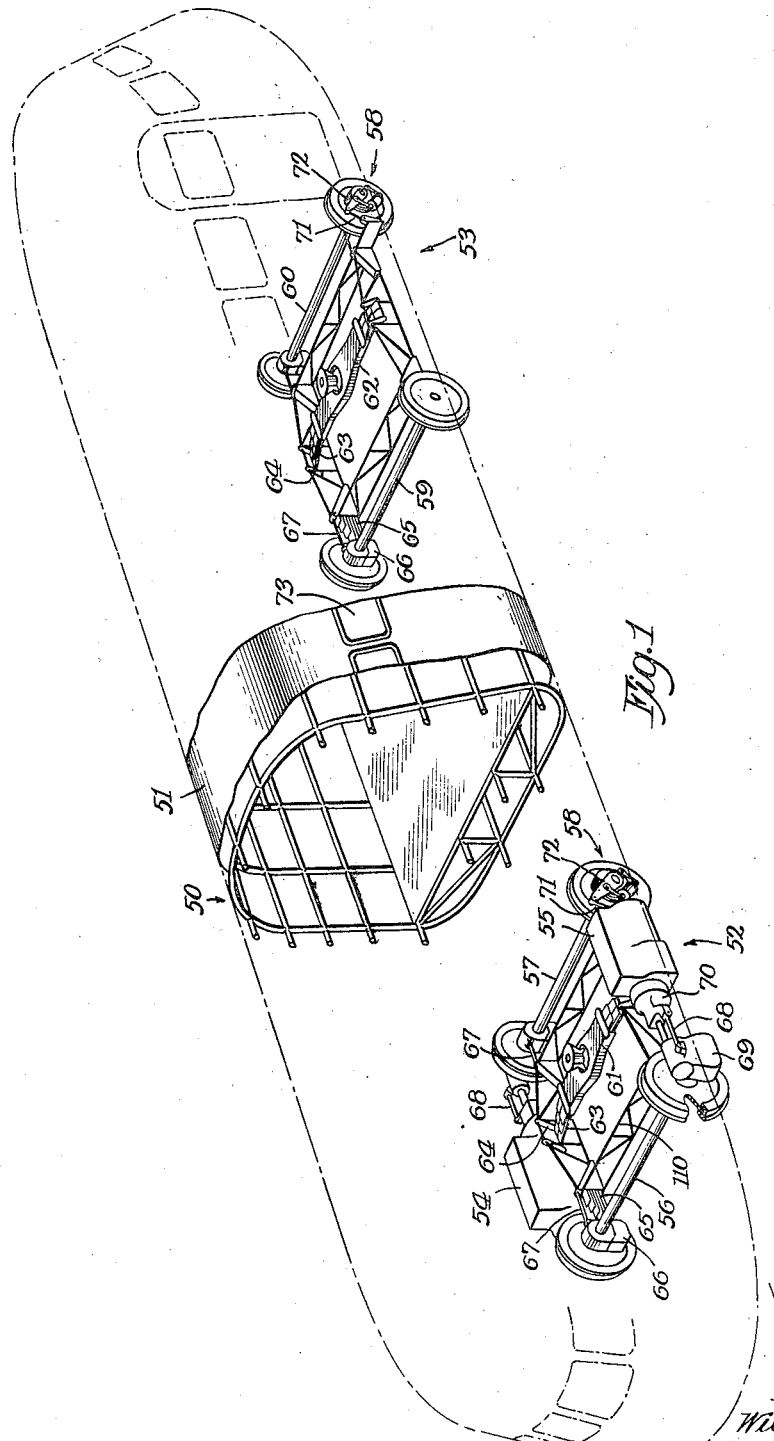

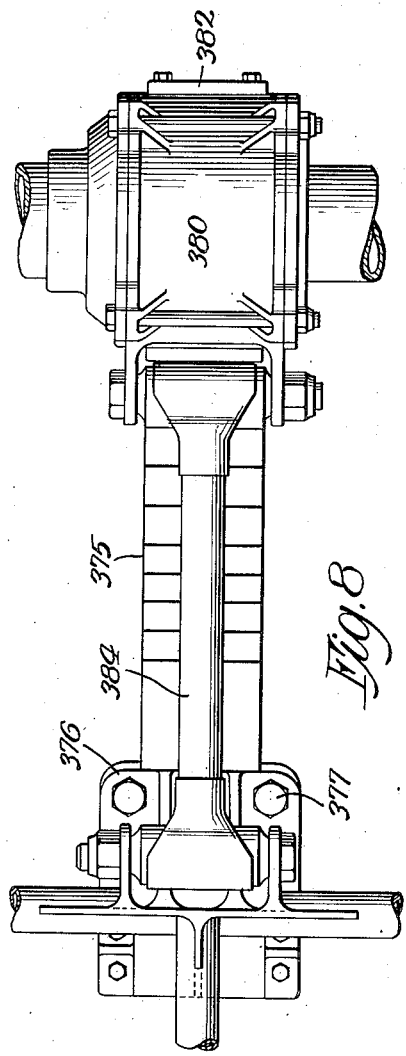
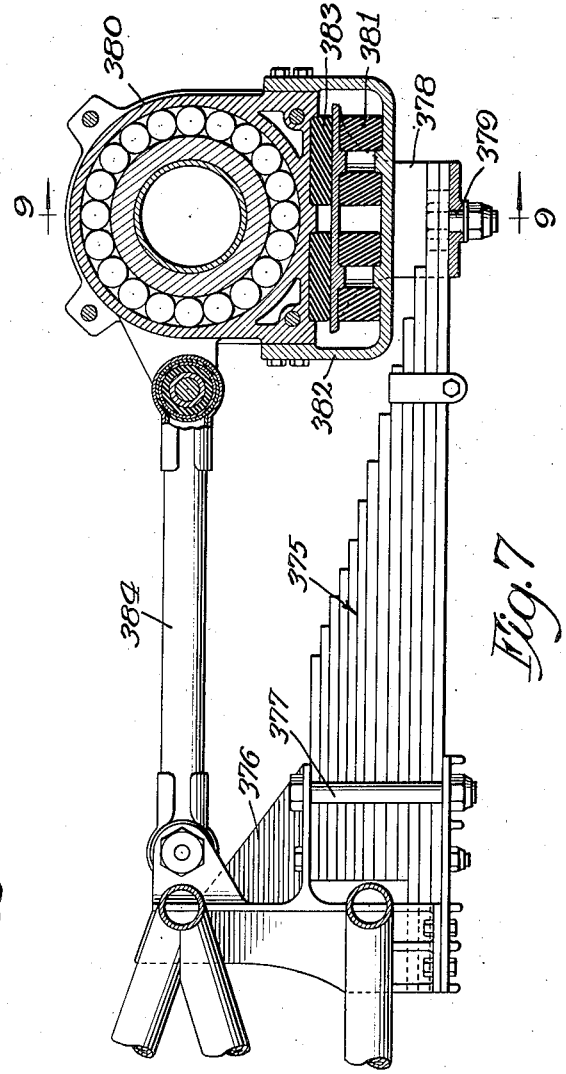
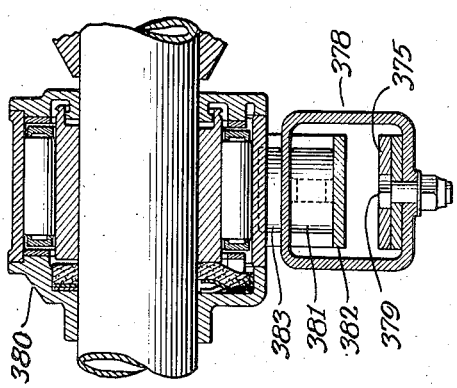

Patented Oct. 6, 1936

2,056,220

UNITED STATES PATENT OFFICE 2,056,220

CAR TRUCK

William B. Stout and Evan H. Wright, Detroit, Mich., assignors to Pullman-Standard Car Manufacturing Company, a corporation of Delaware Application September 2, 1933, Serial No. 688,003

10 Claims. (Cl. 105—224)

The general trend in the fields of air, land and water transportation toward greatly increased speeds has brought about a demand for rail cars which are much faster than those now in use. But to obtain high speeds in railway transportation consistent with safety and economy, the entire organization of the conventional railway car must be altered to meet the new conditions of service.

Light weight is one of the essentials of any car that is capable of traveling at relatively high speeds, for excessive weight requires additional power and there is no power to be wasted if speed is to be obtained.

Air resistance becomes an important factor in dealing with high speed cars. It is important not only as it impedes forward movement of the car, but also as it affects the stability of the car on the track.

In a broad sense, this invention has for its primary object to provide a rail car of a given load capacity, lighter without loss of strength and shock resistance, and faster with less power as compared with prior cars, and also able to hold the track in spite of the greater relative wind velocity at angles to the line of travel which arise from the increased speed, all with appropriate cost, and otherwise suited to existing conditions.

Generally speaking lightness with ample strength is obtained:

First.—By using tubes for all structural members and welding for all joints, whereby the metal is used to the greatest advantage and heavy joint fittings and localized strains are obviated, and the whole body is made one coordinate entity; and Second.—The motors and other weighty elements of the operating mechanism are mounted close to the rails and the parts to be driven or stopped, whereby the body, the center bearing, the side bearings, and all other parts in the line of force transmission, are relieved of much strain and may be made correspondingly lighter.

Being lighter, less power can handle the car as well as its best predecessor but, in addition, the air resistance (which increases rapidly with the speed, other things remaining the same) is tempered by lowering the car and reducing or eliminating suction areas, vortexes or whirls and reverse turbine effects between all parts of the car, the track and other stationary objects, whereby the speed can be increased out of all proportion to the power and speed of the past.

The greater speed increases the transverse component of all wind resistance (and with conventional forms would increase the resultant suction effects) and there would be greater tendency to overturning which the lighter weight would be less able to resist, but for the fact that the wind is passed easily and smoothly under and over the car and the flat upright surfaces are reduced to a minimum, whereby the pressure on the leeward side is kept close to that on the windward side.

In a narrow sense, it is the aim of this invention to provide a novel means for supporting a car truck on the car axles and particularly to provide a truck mounting which is suitable for use with a rail car having the above characteristics.

Other objects within the scope of this invention are to support the car truck so that vibration and noise will be substantially eliminated; the car will ride easily upon the track; the car body will have a relatively low center of gravity; and also so that little maintenance will be required particularly for the purpose of lubrication.

Further and other objects and advantages will become apparent as the disclosure proceeds and the description is read in conjunction with the accompanying drawings, in which Fig. 1 is a diagrammatic, perspective view showing the general organization of a car made in accordance with this invention;

Fig. 2 is a sectional view taken through one of the axle journals and the adjacent part of the truck frame, showing particularly the means for supporting the truck frame on the car axles;

Fig. 3 is a transverse, sectional view taken on the line 3—3 of Fig. 2;

Fig. 4 is a transverse, sectional view taken on the line 4—4 of Fig. 2, the axle being shown in elevation;

Fig. 5 is an exploded perspective view of the center fulcrum for the cantilever spring;

Fig. 6 is an exploded perspective view illustrating the means for supporting the end of the cantilever spring beneath the axle journal;

Fig. 7 illustrates a modified support for the truck frame in which a quarter-elliptical spring is used;

Fig. 8 is a plan view of the modified support; and

Fig. 9 is a sectional view taken on the line 9—9 of Fig. 7.

At the outset, it should be understood that the selection of certain preferred and modified forms of the invention for illustration and description is merely for the purpose of disclosure, for the invention may be variously embodied within the scope of the appended claims. Limitations, therefore, are not to be read into the claims unless required by the prior art.

General organization (Fig. 1)

The illustrative embodiment of the invention, which is shown in diagrammatic perspective in Fig. 1, clearly shows the application of the several fundamental concepts mentioned above to the general organization of the car.

The car body, it will be observed, comprises a space framework 50 of metal tubing that is welded together to form a rigid unitary body. The framework is covered by a metal skin 51 which is secured to the framework and assists in resisting torsional strain.

The body is supported by a front truck 52 and a rear truck 53, the former having internal combustion engines 54 and 55 mounted outboard on opposite sides of the truck. The front truck includes wheeled axles 56 and 57, diametrical ends of which are driven by the motors 54 and 55. The other diametrical ends of the axles 56 and 57 are equipped with brake operating mechanism, generally indicated at 58.

The rear truck 53 includes wheeled axles 59 and 60, each of which are braked by mechanism corresponding to the mechanism 58 of the front truck.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon spring bolsters 61 and 62 of the front and rear trucks, respectively, and, preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal 66. The point of connection between the projecting spring and the journal, is underslung with respect to the axles.

Driving and braking forces applied to the car axles are transmitted to the truck frames by radius rod 67. Other radius arms 68 which connect the worm gear casing 69 to a fixed point on the car truck,—in this case, the transmission housing 70,—take the thrust of the driving worm. Braking forces are resisted by torque arms 71 which connect the brake housing 72 to the truck frame.

The car body, it will be seen, is elongated and has a tapering blunt nose and tail to reduce wind resistance. The outer surface of the car consists of smooth broad curves well blended together to produce a graceful appearance and at the same time directing the air currents around the car with minimum effort. The windows 73 are flush with the outer skin, and are made stationary as it is contemplated that a forced system of ventilation will be used.

The bottom of the car is uninterrupted in outline except for the wheels of the truck which project through the metal skin enveloping the body framework.

Truck support on axles (preferred form)

For the sake of definiteness let it be assumed that the showing in Fig. 2 represents the right rear suspension of the front truck frame 110 on the adjacent car axle 57, although it will be understood that the other points of connection between the front and rear truck frames, and the associated car axles, are identical.

At the four corners of the truck framework are spring housings 112, each of which consists of a bell-shaped casting that is welded into the space framework. The open end of the spring housing faces toward the adjacent axle 57 (Fig. 2), and is adapted to receive the semi-elliptical spring 65, which is shackled in the housing by a bolt 115, passing through suitably reinforced apertures at the rear of the housing.

The individual leaves of the spring 65 are held together by U-bolts 340, that seat within grooves 341 of a fulcrum block 342. The fulcrum block is centered with respect to the spring by a bolt 343, that projects into a recess 344 in the bottom of the fulcrum block. The ends of the U-bolts pass through a clamping plate 345, which is drawn up against the bottom leaf of the spring by nuts 346, threaded on the ends of the U-bolts.

It will be observed that as the load on the spring increases, the center fulcrum point moves toward the axle, and the characteristics of the spring are changed accordingly. The ultimate fulcrum point for maximum load is indicated at 372.

The fulcrum block 342 is provided with a horizontal cylindrical bearing surface 347, in which a semi-cylindrical bearing 348 is adapted to oscillate. The bearing is made of a self-lubricating material, preferably "Oilite", a product made by the Chrysler Corporation, or a subsidiary, in Detroit, Michigan. The top of the bearing has a smooth flat surface 349, to which the truck load is applied through a chrome-finished steel friction plate 351, carried by the spring housing. The bearing has a small sliding movement relative to the frame when the spring flexes.

The purpose of the semi-cylindrical bearing 348 is to permit the fulcrum block 342 to partake of slight rotary movement as the spring is flexed, without producing a strain on any of the supporting elements. Since the bearing is self-lubricating, it requires little, if any, attention.

The sides of the clamp 345 are enlarged, as indicated at 352, to engage the side walls of the housing and maintain the spring in its proper position within the housing. At the center of the enlargement is an aperture 353, adapted to receive the boss 354 on an "Oilite" pad 355, which constitutes the wearing surface for the side of the clamp 345. The "Oilite" pad bears against a chrome-finished steel friction plate 356, which is fastened to the side of the spring housing in any suitable manner.

The projecting end of the spring 65 is resiliently supported beneath the journal box 66 in a special housing 360, which is secured to the journal by bolts 361. A portion of the housing is cut away, as indicated at 362, to receive the spring and permit relative motion between the spring and the housing 360.

The two bottom leaves of the spring 65 are equipped with dowels 363 adjacent to their ends. Two semi-cylindrical Oilite bearings 364 and 365, having suitable recesses in the faces which abut the spring, fit over the projecting ends of the dowels 363, and are adapted to oscillate in upper and lower bearing blocks 366 and 367, respectively, each of which is provided with a suitable horizontal bearing surface, as shown in Fig. 6. The bottom bearing plate rests upon a rubber pad 368, which seats upon the floor of the housing 360, and the upper plate 366 carries a similar pad 369 that bears against the bottom face of the journal 66. It is contemplated that when the parts are assembled the rubber pads 368 and 369 will be under an initial compression, so that the lengthening and shortening of the spring 65 will produce a shearing stress in the rubber. The initial compression of the pads is maintained by the bolts 361 that secure the housing 360 to the journal box 66. The purpose of the upper pad 369 is to cushion the spring on the rebound.

The tubular axle 57 carries its load on the roller bearings 370 in the journal 66, as clearly shown in Figs. 2 and 4.

The radius arm 67 which joins the journal with the truck frame is provided with rubber bushings 371 to further assist in preventing vibrations and noises from reaching the car body.

It will be observed, by referring to Fig. 2, that when the car axle moves up or down relative to the truck frame, the rubber pads 368 and 369 associated with the leaf spring 65 are placed in shear and the rubber bushings 371 associated with the radius rod 67 are placed in compression or tension depending upon the direction of axle movement. When the axle moves upwardly a sufficient amount relative to the truck frame, the fulcrum point of the spring is changed from directly beneath the bearing 348 to the edge 372, and any further upward movement of the axle relative to the truck frame is taken up only by the spring 65 (limiting the amount of strain which is applied to the rubber elements 368, 369 and 371) since the new fulcrum 372 makes a parallelogram of the connections and permits relative movement to take place without substantial stresses being applied to the joints.

*Truck support on axles (modified form)*

In the modified form of truck support shown in Figs. 7–9 inclusive, a quarter-elliptical spring 375 is used, which is clamped to a bracket 376 on the truck frame by bolts 377. The end of the spring rests upon a stirrup 378, and the bolt 379 which secures the spring to the stirrup permits a certain amount of relative movement to take place. The stirrup is supported from the journal 380 on a resilient rubber pad 381, the stirrup being linked to a depending U-strap 382 bolted to the bottom of the journal 380. Rubber blocks 383 are interposed between the stirrup and the bottom of the journal to absorb rebound.

The journal box is connected to the truck frame by a radius rod 384 in much the same manner as before.

We claim as our invention:

1. In a car truck including a semi-elliptical spring of the cantilever type, a center fulcrum comprising a casting seated on the top of the spring and having a cylindrical bearing surface on its upper face, a semi-cylindrical bearing having a limited sliding movement longitudinally of the truck and rotatable on the casting through angles within narrow limits, and means for transmitting a vertical load to the top side of said bearing.

2. In a railway car truck, a pair of wheeled axles, a truck frame, a truck bolster resiliently supported on the frame, and means at each corner of the truck frame for mounting the truck frame on the axles, said means including a journal box, a leaf spring on the truck frame having one end resiliently anchored to the underside of the journal box, and a radius rod extending between the upper portion of the journal box and the truck frame.

3. In a railway car truck, a pair of wheeled axles, a truck frame, a truck bolster resiliently supported on the frame, and means at each corner of the truck frame for mounting the truck frame on the axles, said means including a journal box, a leaf spring on the truck frame having one end resiliently anchored to the underside of the journal box, and a radius rod extending between the upper portion of the journal box and the truck frame, and resilient means interposed in the radius rod connection.

4. In a railway car truck, a pair of wheeled axles, a truck frame, a truck bolster resiliently supported on the frame, and means at each corner of the truck frame for mounting the truck frame on the axles, said means including a journal box, a leaf spring on the truck frame having one end anchored to the underside of the journal box, and means independent of the spring for resiliently resisting movement of the box relative to the truck frame.

5. In a railway car truck, a pair of wheeled axles, a truck frame, a truck bolster resiliently supported on the frame, and means at each corner of the truck frame for mounting the truck frame on the axles, said means including a journal box, a half elliptic spring having one end fixedly anchored to the truck frame and the other end anchored to the underside of the journal box, means for applying a portion of the truck load to the spring at a point intermediate its ends, and means in addition to the spring for resiliently resisting movement of the box relative to the frame.

6. In a railway car truck, a pair of wheeled axles, a truck frame, a truck bolster resiliently supported on the frame, and means at each corner of the truck frame for mounting the truck frame on the axles, said means including a journal box, a half elliptic spring having one end fixedly anchored to the truck frame and the other end anchored to the underside of the journal box, means for applying a portion of the truck load to the spring at a point intermediate its ends, an anti-friction bearing at said point of load application, and means in addition to the spring for resiliently resisting movement of the box relative to the frame.

7. In a railway car truck, a truck frame, a truck bolster resiliently supported on the truck frame, a pair of wheeled axles, journal boxes at the ends of the axles, and means for mounting the truck frame on said journal boxes, said means including a leaf spring having one end fixedly secured to the truck frame and the other end secured to one of the journal boxes with the truck load being applied to the spring at a point intermediate its ends whereby there is relative longitudinal movement between the truck frame and the spring at the point of load application, and plane bearing surfaces at said point of load application.

8. In a railway car truck, a truck frame, a truck bolster resiliently supported on the truck frame, a pair of wheeled axles, journal boxes at the ends of the axles, and means for mounting the truck frame on said journal boxes, said means including a leaf spring having one end fixedly secured to the truck frame and the other end secured to one of the journal boxes with the truck load being applied to the spring at a point intermediate its ends whereby there is relative longitudinal movement between the truck frame and the spring at the point of load application, and plane and curved bearing surfaces at said point of load application.

9. In a railway car truck, a truck frame, a truck bolster resiliently supported on the truck frame, a pair of wheeled axles, journal boxes at the ends of the axles, and means for mounting the truck frame on said journal boxes, said means including a leaf spring having one end fixedly secured to the truck frame and the other end secured to one of the journal boxes with the truck load being applied to the spring at a point intermediate its ends whereby there is relative longitudinal movement between the truck frame and the spring at the point of load application, and bearing means between the truck frame and the sides of said leaf spring.

10. In a railway car truck, a truck frame, a truck bolster resiliently supported on the truck frame, a pair of wheeled axles, journal boxes at the ends of the axles, and means for mounting the truck frame on said journal boxes, said means including a cantilever spring having one end anchored to the truck frame and the other end anchored to the underside of one of the journal boxes, a radius rod between the truck frame and the upper portion of the journal box, rubber elements at the connection between the spring and the journal box and in the radius rod connection, means for shifting the point of load application from the point of anchorage to the truck frame to a point nearer the axle after the spring has been flexed a predetermined amount, and means for relieving the rubber elements of further strain when the springs are flexed beyond said predetermined amount.

WILLIAM B. STOUT.
EVAN H. WRIGHT.